United States Patent
Ballew et al.

(10) Patent No.: US 12,107,823 B2
(45) Date of Patent: Oct. 1, 2024

(54) SYSTEMS AND METHODS TO PROVIDE DYNAMIC CAPACITY ADJUSTMENTS IN DIFFERENT ANYCAST REGIONS

(71) Applicant: CenturyLink Intellectual Property LLC, Broomfield, CO (US)

(72) Inventors: Dean Ballew, Sterling, VA (US); John R. B. Woodworth, Amissville, VA (US)

(73) Assignee: CenturyLink Intellectual Property, Broomfield, CO (US)

( * ) Notice: Subject to any disclaimer, the term of this patent is extended or adjusted under 35 U.S.C. 154(b) by 0 days.

(21) Appl. No.: 18/360,924

(22) Filed: Jul. 28, 2023

(65) Prior Publication Data
US 2024/0048525 A1 Feb. 8, 2024

Related U.S. Application Data

(60) Provisional application No. 63/370,146, filed on Aug. 2, 2022.

(51) Int. Cl.
*G06F 15/16* (2006.01)
*H04L 61/4511* (2022.01)
*H04L 67/1021* (2022.01)

(52) U.S. Cl.
CPC ...... *H04L 61/4511* (2022.05); *H04L 67/1021* (2013.01)

(58) Field of Classification Search
CPC .......... H04L 61/4511; H04L 67/1021
USPC ....................................... 709/245
See application file for complete search history.

(56) References Cited

U.S. PATENT DOCUMENTS

| | | | | |
|---|---|---|---|---|
| 6,728,748 | B1 * | 4/2004 | Mangipudi | H04L 43/0811 |
| | | | | 718/105 |
| 8,166,108 | B1 * | 4/2012 | Peters | H04L 63/104 |
| | | | | 707/821 |
| 8,204,976 | B2 * | 6/2012 | Swildens | H04L 67/1001 |
| | | | | 709/224 |
| 8,244,915 | B1 * | 8/2012 | Peters | G06Q 30/0605 |
| | | | | 707/821 |
| 8,316,106 | B2 * | 11/2012 | Hajiaghayi | H04L 67/288 |
| | | | | 709/219 |
| 8,386,629 | B2 * | 2/2013 | Tan | H04L 67/01 |
| | | | | 709/204 |
| 8,468,247 | B1 * | 6/2013 | Richardson | H04L 67/1021 |
| | | | | 709/224 |
| 8,510,807 | B1 * | 8/2013 | Elazary | G06Q 30/06 |
| | | | | 709/224 |
| 8,543,711 | B2 * | 9/2013 | Rolia | G06Q 30/02 |
| | | | | 709/229 |
| 8,583,769 | B1 * | 11/2013 | Peters | H04L 63/104 |
| | | | | 709/221 |
| 8,606,964 | B2 * | 12/2013 | Hajiaghayi | H04L 67/568 |
| | | | | 709/219 |

(Continued)

*Primary Examiner* — Alicia Baturay

(57) ABSTRACT

Multiple Anycast regions may be defined, and a separate Anycast address may be used for each region in order to localize client requests. In examples, when one or more Anycast servers in a first Anycast region fail or become overburdened (or are predicted to do so), one or more Anycast server in another, geographically or logically separate Anycast region that has additional capacity to handle client service requests may be dynamically added to the first Anycast region.

17 Claims, 5 Drawing Sheets

(56) References Cited

U.S. PATENT DOCUMENTS

| | | | | |
|---|---|---|---|---|
| 8,612,564 B2* | 12/2013 | Swildens | H04L 41/509 |
| | | | 709/224 |
| 8,626,910 B1* | 1/2014 | Lientz | H04L 43/0888 |
| | | | 709/224 |
| 8,676,918 B2* | 3/2014 | Richardson | H04L 67/568 |
| | | | 709/224 |
| 8,683,043 B1* | 3/2014 | Peters | G06Q 30/0605 |
| | | | 709/219 |
| 8,738,743 B2* | 5/2014 | Tan | H04L 12/18 |
| | | | 709/219 |
| 8,745,177 B1* | 6/2014 | Kazerani | H04L 41/5067 |
| | | | 709/224 |
| 8,868,701 B1* | 10/2014 | Peters | G06Q 30/0641 |
| | | | 709/221 |
| 8,886,754 B2* | 11/2014 | Tan | H04L 12/18 |
| | | | 370/312 |
| 8,914,814 B1* | 12/2014 | Middleton | H04L 65/80 |
| | | | 718/104 |
| 8,959,212 B2* | 2/2015 | Lientz | H04L 43/0888 |
| | | | 709/224 |
| 9,003,035 B1* | 4/2015 | Richardson | H04L 61/301 |
| | | | 709/224 |
| 9,009,277 B2* | 4/2015 | Peters | H04L 63/104 |
| | | | 709/224 |
| 9,098,464 B2* | 8/2015 | Hajiaghayi | H04L 67/568 |
| 9,130,762 B2* | 9/2015 | Tan | H04L 67/06 |
| 9,148,362 B2* | 9/2015 | Johri | H04L 12/18 |
| 9,357,076 B2* | 5/2016 | Rosenberg | H04L 61/4511 |
| 9,379,991 B2* | 6/2016 | Turányi | H04L 47/35 |
| 9,420,050 B1* | 8/2016 | Sakata | G06F 9/46 |
| 9,426,213 B2* | 8/2016 | Gerber | H04L 67/568 |
| 9,438,444 B1* | 9/2016 | Middleton | G06Q 30/0605 |
| 9,497,259 B1* | 11/2016 | Richardson | H04L 67/01 |
| 9,614,687 B2* | 4/2017 | Rosenberg | H04L 12/1818 |
| 9,787,775 B1* | 10/2017 | Richardson | H04L 67/10 |
| 9,794,152 B2* | 10/2017 | Lientz | H04L 41/083 |
| 9,800,421 B2* | 10/2017 | Johri | H04L 45/16 |
| 10,015,237 B2* | 7/2018 | Richardson | H04L 67/10 |
| 10,097,398 B1* | 10/2018 | Richardson | H04L 61/4511 |
| 10,165,093 B2* | 12/2018 | Filsfils | H04L 45/50 |
| 10,187,350 B2* | 1/2019 | Gerber | H04L 67/1001 |
| 10,225,322 B2* | 3/2019 | Richardson | H04L 67/101 |
| 10,373,219 B2* | 8/2019 | Middleton | H04L 67/535 |
| 10,506,062 B2* | 12/2019 | Tan | H04L 67/1097 |
| 10,567,333 B2* | 2/2020 | Sawyer | H04L 47/122 |
| 10,645,008 B1* | 5/2020 | Sawyer | H04L 45/028 |
| 10,666,610 B2* | 5/2020 | Gerber | H04L 67/568 |
| 10,931,738 B2* | 2/2021 | Richardson | H04L 67/52 |
| 10,979,386 B2* | 4/2021 | Gerber | H04L 61/5007 |
| 10,992,536 B2* | 4/2021 | Karasaridis | H04L 67/10 |
| 11,095,680 B2* | 8/2021 | Smith | H04L 63/10 |
| 11,190,481 B2* | 11/2021 | Sawyer | H04L 12/5691 |
| 11,228,459 B1* | 1/2022 | Subramanian | H04L 12/4641 |
| 11,277,328 B1* | 3/2022 | Sharma | H04L 45/02 |
| 11,336,579 B2* | 5/2022 | Sawyer | H04L 45/028 |
| 11,336,712 B2* | 5/2022 | Richardson | G06F 16/43 |
| 11,632,420 B2* | 4/2023 | Richardson | H04L 67/10 |
| | | | 709/203 |
| 11,824,923 B2* | 11/2023 | Wragg | H04L 12/4633 |
| 11,848,852 B1* | 12/2023 | Sharma | H04L 61/5069 |

\* cited by examiner

SYSTEMS AND METHODS TO PROVIDE DYNAMIC CAPACITY ADJUSTMENTS IN DIFFERENT ANYCAST REGIONS

CROSS-REFERENCE TO RELATED APPLICATIONS

This application claims the benefit of U.S. Provisional Application No. 63/370,146 filed Aug. 2, 2022, entitled "Systems and Methods to Provide Dynamic Capacity Adjustments in Different Anycast Regions," which is incorporated herein by reference in its entirety.

BACKGROUND

In large scale service deployments, such as content delivery networks, components may be localized or regionalized for resource optimization. When usage patterns change quickly in regions, due to events outside expectations, service within these regions can be impacted. In some examples, the growth is ephemeral, due to a promotion or public event, and sometimes the growth is too rapid for additional equipment in the affected region to be deployed.

While relatively specific examples have been discussed, it should be understood that aspects of the present disclosure should not be limited to solving the specific examples identified in the background.

SUMMARY

The disclosure generally relates to defining Anycast regions to localize service within a network and then dynamically modifying capacity of a first Anycast region by temporarily causing device(s) in a second Anycast region to advertise the localized Anycast address of the first Anycast region.

In examples, the present application discloses a method, comprising: causing at least a first server set in a first Anycast region to advertise a first Anycast address for a first service, wherein the first server set comprises at least a first server; causing at least a second server set in a second Anycast region to advertise a second Anycast address for a second service, wherein the second server set comprises at least a second server; determining that a first Anycast region requires additional server capacity; determining a period of time to provide the additional server capacity; in response to determining that the first Anycast region requires additional server capacity, causing the second server in the second Anycast region to advertise the first Anycast address; and after the period of time, causing the second server in the second Anycast region to cease advertising the first Anycast address.

In additional examples, the present application discloses a system, comprising: at least one processor; and memory, operatively connected to the at least one processor and storing instructions that, when executed by the at least one processor, cause the system to perform a method. In examples, the method comprises: causing at least a first server set in a first Anycast region to advertise a first Anycast address for a first service, wherein the first server set comprises at least a first server; causing at least a second server set in a second Anycast region to advertise a second Anycast address for a second service, wherein the second server set comprises at least a second server; determining that a first Anycast region requires additional server capacity; determining a period of time to provide the additional server capacity; in response to determining that the first Anycast region requires additional server capacity, causing the second server in the second Anycast region to advertise the first Anycast address; and after the period of time, causing the second server in the second Anycast region to cease advertising the first Anycast address.

In additional examples, the present application discloses a system, comprising: at least one processor; and memory, operatively connected to the at least one processor and storing instructions that, when executed by the at least one processor, cause the system to perform a method. In examples, the method comprises: causing at least a first server set in a first Anycast region to advertise a first Anycast address for a first service, wherein the first server set comprises at least a first server; causing at least a second server set in a second Anycast region to advertise a second Anycast address for a second service, wherein the second server set comprises at least a second server; determining that a first Anycast region requires additional server capacity; in response to determining that the first Anycast region requires additional server capacity, causing the second server in the second Anycast region to advertise the first Anycast address; dynamically determining whether the first Anycast region continues to require additional server capacity; and based on dynamically determining that the first Anycast region no longer requires additional server capacity, causing the second server in the second Anycast region to cease advertising the first Anycast address.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
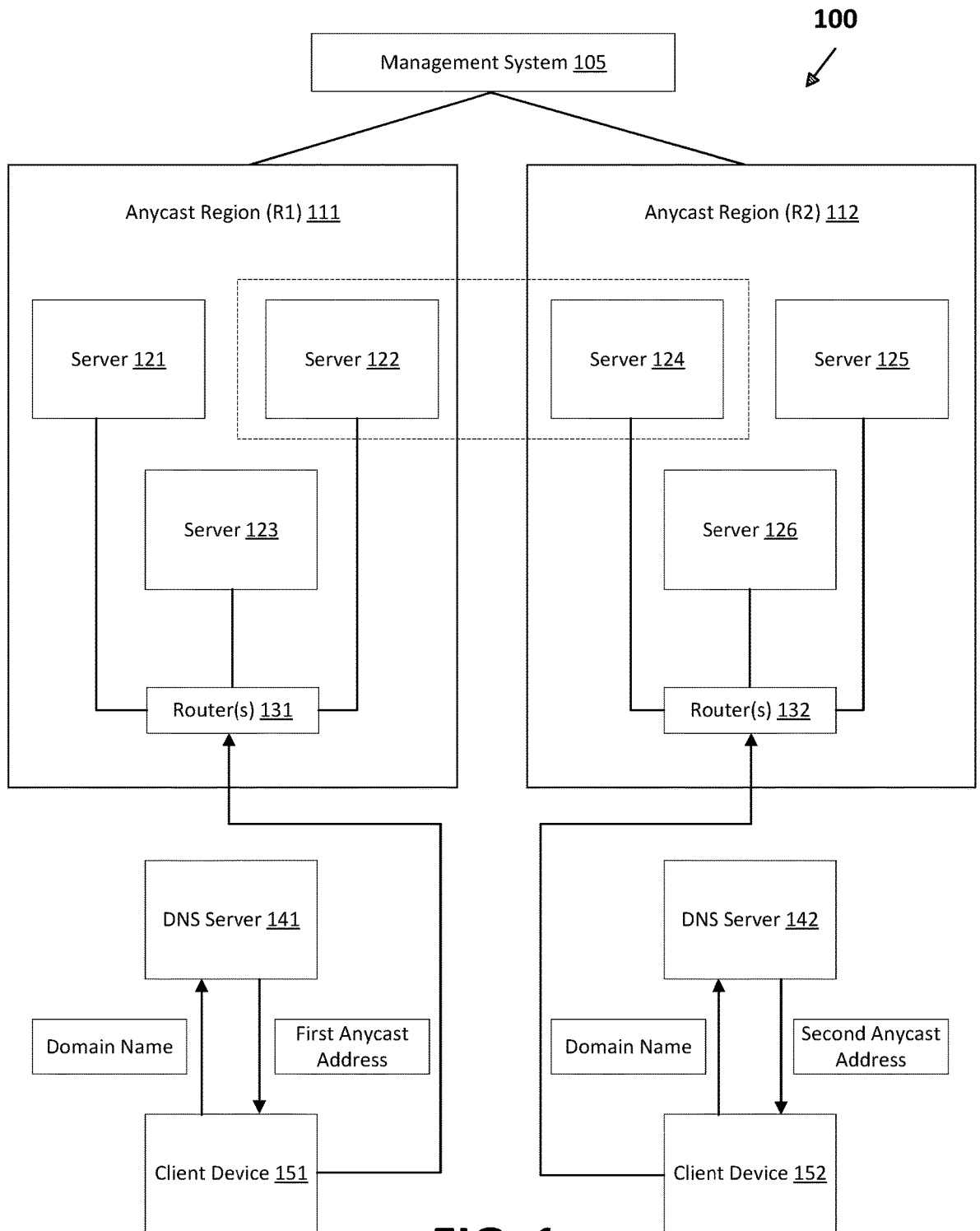
FIG. 1 depicts an example system according to aspects of the present application.

The following detailed description refers to the accompanying drawings. Where possible, the same reference numbers may be used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. The following detailed description is, therefore, not to be taken in a limiting sense.

In an Anycast internet protocol (IP) addressing system, multiple servers advertise a single IP address so that client requests are dynamically distributed across the servers of a particular Anycast region. Basic Anycast routing is described, e.g., in Request for Comments: 1546, "Hosting Anycast Service," dated November 1993, available at https://datatracker.ietf.org/doc/html/rfc1546, which is incorporated by reference herein in its entirety. In some present examples, multiple Anycast regions are defined, and a separate Anycast address is used for each region in order to localize requests. In example systems and methods of the present application, when one or more Anycast servers in a first Anycast region fail or are overburdened (or are predicted to do so), an Anycast server in another, geographically or logically separate Anycast region that has additional capacity to handle client service requests may be dynamically added to the first Anycast region.

In examples, a DNS request is submitted by a client device to resolve a domain name associated with a first service. For example, the first service may comprise serving content from caching servers in a content delivery network (CDN). For example, a browser on a client device may receive a user-initiated request to access content from a particular domain (e.g., www.example.com). The domain name may be translated by a DNS server in a first Anycast region to a first Anycast IP address that is advertised by multiple servers. When the client device then addresses a request to the first Anycast IP address, the request may be received by one or more router(s). The router(s) may, in examples, determine a route to the topographically closest destination for the client request—that is, the closest server advertising the first Anycast IP address. In some examples, this is accomplished by border gateway protocol (BGP) routing techniques. In some examples, the router(s) may also be configured to consider the load, response times, or other usage metrics of particular servers advertising the first Anycast IP address in choosing the best option for responding to the client request.

In present examples, a management system may monitor performance of the servers in different Anycast regions. When servers in a first Anycast region become overloaded (e.g., as identified by increasing response times, CPU usage, error message rates, packet loss, etc.), the management system may cause a server in a second Anycast region to be temporarily included in the first Anycast region. In examples, this may be accomplished by causing the server in the second Anycast region to begin to advertise the Anycast IP address typically only advertised by the servers in the first Anycast region (also referred to herein as a first Anycast address).

In some examples, the management system may cause a server in the first Anycast region to provide access and/or authorization credentials to any necessary data (via container, pointers, etc.) to the server in the second Anycast region that is temporarily advertising the first Anycast address. For example, the server in the second Anycast region that is temporarily advertising the first Anycast address may need access content that is typically only served by servers in the first Anycast region. In some examples, this may be useful where content is localized. Any required access permissions or security information may be also be provided to the server(s) in the second Anycast region. The server in the second Anycast region then begins to advertise the same address as the server(s) in the first Anycast region and may receive client requests directed to the first Anycast address. In this way, the server in the second Anycast region may temporarily act as a server in the first Anycast region for a preset and/or dynamically determined period of time.

FIG. 1 depicts an example system 100. Client devices 151, 152 may connect to a communications network by sending requests through router(s) 131 and router(s) 132. In the depicted example, router(s) 131, and router(s) 132 may route requests from client devices 151, 152 to servers 121, 122, 123 and 124, 125, and 126 in Anycast regions 111, 112.

In examples, a first Anycast region R1 111 may comprise one or more servers, such as servers, 121, 122, and 123, and a second Anycast region R2 112 may comprise one or more servers, such as servers, 124, 125, and 126. Each of the Anycast regions 111, 112 may also comprise router(s), 131, 132. In addition, the individual components (servers and routers) of each of the Anycast regions 111, 112 may be communicatively connected to a management system 105. Operation of the example system 100 is discussed below.

In an illustrative example, as shown in FIG. 1, during normal operation, servers 121, 122, 123 in a first Anycast region 111 may process client requests for a first region R1, while servers 124, 125, 126 in a second Anycast region 112 may process client requests for a second region R2. In examples, the regions may be predetermined and definitions of the regions may be stored on management system 105. Regions may be determined based on security boundaries, geographic location, logical proximity, or otherwise. For example, R1 may comprise servers and routers in North America, while R2 may comprise servers and routers in Europe. In addition, management system 105 may adjust regions based on network parameters (e.g., changing topography, etc.).

In examples, a client device 151 may send a DNS request that may include a domain name (e.g., www.example.com). In examples, the client device 151 may send the DNS request through a router that may be operatively connected to the client device 151, such as a LAN-connected router. In examples, the client device 151 (or associated LAN router(s)) may be configured to determine a particular DNS server to which DNS requests for client device 151 should be sent (e.g., by obtaining an IP address from a DHCP server). In an illustrative example, a request from client device 151 may be routed to DNS server 141. DNS server 142 may perform similar services for client device 152.

The DNS server 141 may translate the domain name into an IP address for client 151 to use in communicating with the requested domain (e.g., IP address of www.example.com). In examples, the IP address may be an Anycast address that may be advertised by a plurality of servers of an Anycast region, such as Anycast region R1 111 or Anycast region R2 112. In examples, the DNS server 141 may maintain a mapping between the domain name example.com and a first Anycast address, while the DNS server 142 may maintain a mapping between the domain name example.com and a second Anycast address. In examples, the DNS servers 141, 142 maintain a mapping of the domain name to an Anycast address for a region that the DNS server is a part of (or closest to). For example, DNS server 141 may be in North America and may be configured to maintain a mapping between example.com and a first Anycast address that is advertised by servers 121, 122, 123, which may also be located in North America. By contrast, DNS server 142 may be in Europe and may be configured to maintain a mapping between example.com and a second Anycast address that is advertised by servers 124, 125, 126, which may also be located in Europe.

By maintaining a mapping to a regionally appropriate Anycast IP address, the DNS servers 141, 142 may cause client requests to particular domains to be routed to the most efficient server(s) to service those request(s). For example, DNS server 141 may return the first Anycast address, which is advertised by servers 121, 122, 123 in Anycast region R1 111 to client device 151. Client device 151 may then use the first Anycast address to communicate with the example.com domain. Requests sent by client device 151 will be routed by one or more router(s) 131 to server(s) advertising the first Anycast address (e.g., which, under normal conditions, comprises servers 121, 122, 123).

Each client device 151, 152 may thus send a request that includes an Anycast address that is specific to the region of the client device. In some examples, the client device 151, 152 may receive the localized Anycast address as a result of a DNS query, as described above. In other examples, the client device 151, 152 may be configured with, or otherwise obtain, the localized Anycast address in one or more other manners. One or more router(s) 131, 132 may then route the client request to one of the servers 121, 122, 123 in R1 or servers 124, 125, 126 in R2. For example, the client device 151 may send a request to a first Anycast address, and router(s) 131 may route the request to one of the servers 121, 122, or 123, each of which advertises the first Anycast address.

In examples, the router(s) 131 may comprise one or a plurality of routing devices. For example, messages directed to a first Anycast address may need to traverse multiple hops between router(s) 131 before reaching a server (e.g., one of servers 121, 122, 123) that is advertising the first Anycast address. In general, router(s) 131 will seek a shortest available path to a destination that advertises the first Anycast address; however, routing tables of router(s) 131 may be manipulated to prioritize certain servers advertising the first Anycast address over others, as described further herein.

In examples, when router(s) 131 receive a message with a destination IP address that is an Anycast address, the router(s) 131 may use routing tables to determine a server that is the logically closest (or least-cost) server that is advertising that Anycast address. In an illustrative example, router(s) 131 may route a client request to sever 121 in Anycast region 111 if server 121 is determined to be the logically closest (or least-cost) server that is advertising the first Anycast address. In examples, servers 121, 122, 123, 124, 125, 126 each may comprise one or more physical servers, virtualized server(s) managed by a hypervisor running on one or more physical device(s), or any combination thereof.

Devices in Anycast region R1 111 and Anycast Region R2 112 may also communicate with a management system 105. In examples, the management system 105 may be communicatively coupled with servers 121, 122, 123, 124, 125, 126 in Anycast regions 111, 112 to obtain capacity metrics and to control configuration of such servers. In examples, capacity metrics comprise metrics that indicate usage or availability of computing or networking resources for device(s) in the Anycast regions. Examples of capacity metrics may include central processing unit (CPU) usage, memory usage, error rate, rate of packet loss, incoming or outgoing message traffic levels, request/response latency, etc. In examples, capacity metrics are continually and/or periodically updated via queries by management system 105 to servers 121, 122, 123, 124, 125, 126 and/or by software agent(s) operating on one or more of the device(s) operating in Anycast region R1 111 and Anycast Region R2 112 and configured to send the required capacity metrics to management system 105.

In examples, capacity metrics reported by the servers 121, 122, 123, 124, 125, 126 may be used by the management system 105 to determine whether one or more of the Anycast regions 111, 112 require additional capacity from server(s) in another of the Anycast region(s). Those of skill in the art will appreciate that although two Anycast regions are depicted, more Anycast regions may be defined and employed.

For example, one or more capacity metric(s) of devices in Anycast regions 111, 112 may be compared to one or more capacity threshold(s) in order to determine whether current (or predicted future) conditions warrant adding or removing capacity to one or more of the Anycast regions 111, 112. In examples, capacity threshold(s) for Anycast region 111 may be different from capacity threshold(s) for Anycast region 112. In other examples, thresholds may be the same.

Thresholds may be time-based. For example, a threshold may comprise a certain number of client requests that are processed within a preset window of time (e.g., the past X minutes, or CPU usage that has been above X % for Y minutes, etc.). In addition, the threshold(s) may be based on a combination of more than one capacity metric (e.g., CPU usage over X % for Y minutes and number of lost packets exceeding a limit within a preset window, etc.). Further, thresholds, in some examples, may be set based on a capacity metric for an individual server, for multiple servers, or for an entire Anycast region. For example, a threshold might comprise any one server being over X % CPU usage, while another threshold may comprise the cumulative CPU usage for the entire Anycast region exceeding X %. Other thresholds are possible and contemplated.

Further, the management system 105 may determine whether a particular Anycast region 111, 112 requires additional capacity based on predicted future conditions. For example, management system 105 may include one or more artificial intelligence/machine-learning (AI/ML) model(s). The AI/ML model(s) may be based on supervised and/or unsupervised learning techniques, and the model(s) may be trained to recognize patterns in reported capacity metric(s) and/or other network conditions that predict future outages or service interruptions. For example, rather than simply reacting to real-time capacity metrics (and comparing them to established threshold(s)), the management system 105 (and any AI/ML models employed thereby) may determine that adding capacity to a first Anycast region using server(s) from one or more other Anycast region(s) is needed to prevent certain capacity metric(s) from exceeding thresholds or to otherwise prevent network or service failure(s).

As a non-exclusive example, management system 105 may predict a temporary surge in client request(s) in a first Anycast region 111 (e.g., in North America) for a first service (e.g., a CDN service). The temporary surge may be caused, e.g., by the release of a new blockbuster movie or game. Further, the management system 105 may predict a decrease in client request(s) in a second Anycast region 112 (e.g., in Europe, as it becomes later in the day there). In examples, the management system 105 may predict that additional resources will be needed in the coming hours in first Anycast region 111 and that decreasing demand on second Anycast region 112 will allow one or more server(s) of the second Anycast region 112 to provide temporary service to first Anycast region 111 without negatively impacting service in the second Anycast region 112.

As an illustrative example, depending on capacity metrics, management system 105 may determine that one or more server(s) of a first Anycast region 111 has exceeded (or is predicted to exceed) a capacity threshold to perform a service (e.g., processing client requests for content from clients, such as client device 151). In examples, depending on current and/or predicted capacity metrics, management system 105 may determine that one or more sever(s) in a second Anycast region R2 112 (e.g., server 124) may possess additional capacity to perform the service in Anycast region R1 111.

In examples, management system 105 may cause a server of second Anycast region 112 to advertise the first Anycast address typically advertised only by servers in the first Anycast region 111. In an illustrative example, management system 105 may cause server 124 of an Anycast region 112 to advertise the first Anycast address (typically only advertised by servers 121, 122, 123 in Anycast region 111). In other examples, management system 105 may cause a plurality of servers 124, 125, 126 of a second Anycast region 112 to advertise the first Anycast address. As an example, management system 105 may cause all of servers 124, 125, and 126 of an Anycast region 112 to advertise the first Anycast address.

In examples, management system 105 may cause a server of Anycast region R2 112 to advertise the first Anycast address for a certain period of time, wherein the period of time may be dynamically determined from the actual or predicted capacity metrics of the first Anycast region 111. In examples, the period of time may also be dynamically determined from the capacity metrics of the second server (e.g., based on how busy the second server already is or is expected to be). In further examples, management system 105 may cause a second server of a second Anycast region to advertise the first Anycast address for a period of time that has been predetermined (e.g., a period of time preset by a network administrator). In examples, dynamically determining may comprise periodically or continually determining the period of time a second server advertises the first Anycast address in accordance with real-time (or substantially real-time) capacity metrics (and/or predicted capacity metrics) of the first Anycast region 111 and/or of the second server.

In examples, management system 105 may populate one or more routing table(s) of router(s) 131, 132 to identify a server 124 in Anycast region 112 as advertising the first Anycast address. In further examples, router(s) 131, 132 may also continue to route client request(s) addressed to the first Anycast address to servers 121, 122, and 123 in Anycast region 111.

In addition to populating the routing table(s) of router(s) 131, 132, management system 105 may intentionally promote a routing path to server(s) of Anycast region R2 112 that are temporarily advertising the first Anycast address, even if the routing table(s) continue to include routing destinations to servers 121, 122, 123 of the first Anycast region R1 111. In this way, router(s) 131 of a first Anycast region may be caused by management system 105 to temporarily route client requests to a server (e.g., server 124) of a second Anycast region R1 112, even if server 124 is not the logically closest, or least-cost, server.

In further examples, in addition to causing server(s) of a second Anycast region R2 112 to advertise the first Anycast address, management system 105 may also communicate operational data to the second server (or cause such data to be available to the server(s) in the second Anycast region R2 112). For example, management system 105 may cause a container to be communicated to the second server (e.g., server 124). In examples, the container may comprise a virtual server that may process any client requests directed to the first Anycast address. In examples, the container may additionally comprise a pointer that may contain the destination path to a database or other data source specific to the first Anycast region. For example, the service in question may be a CDN service where content requests from clients in the first Anycast region return different data than would be available to the server(s) in the second Anycast region (due to data localization, or otherwise). In further examples, management system 105 may cause a second server of a second Anycast region 112 to have permission to access the database or other data source specific to a first Anycast region 111.

In an illustrative example, a management system 105 may communicate to the server 124 of Anycast region 112 that is advertising the first Anycast address a pointer to a database that may be required by server 124 to process a client request routed by router(s) 131. In examples, management system 105 may also provide server 124 with authorization token(s) to communicate with other Anycast regions of which it is not a member, such as Anycast region 111.

Figure 2:
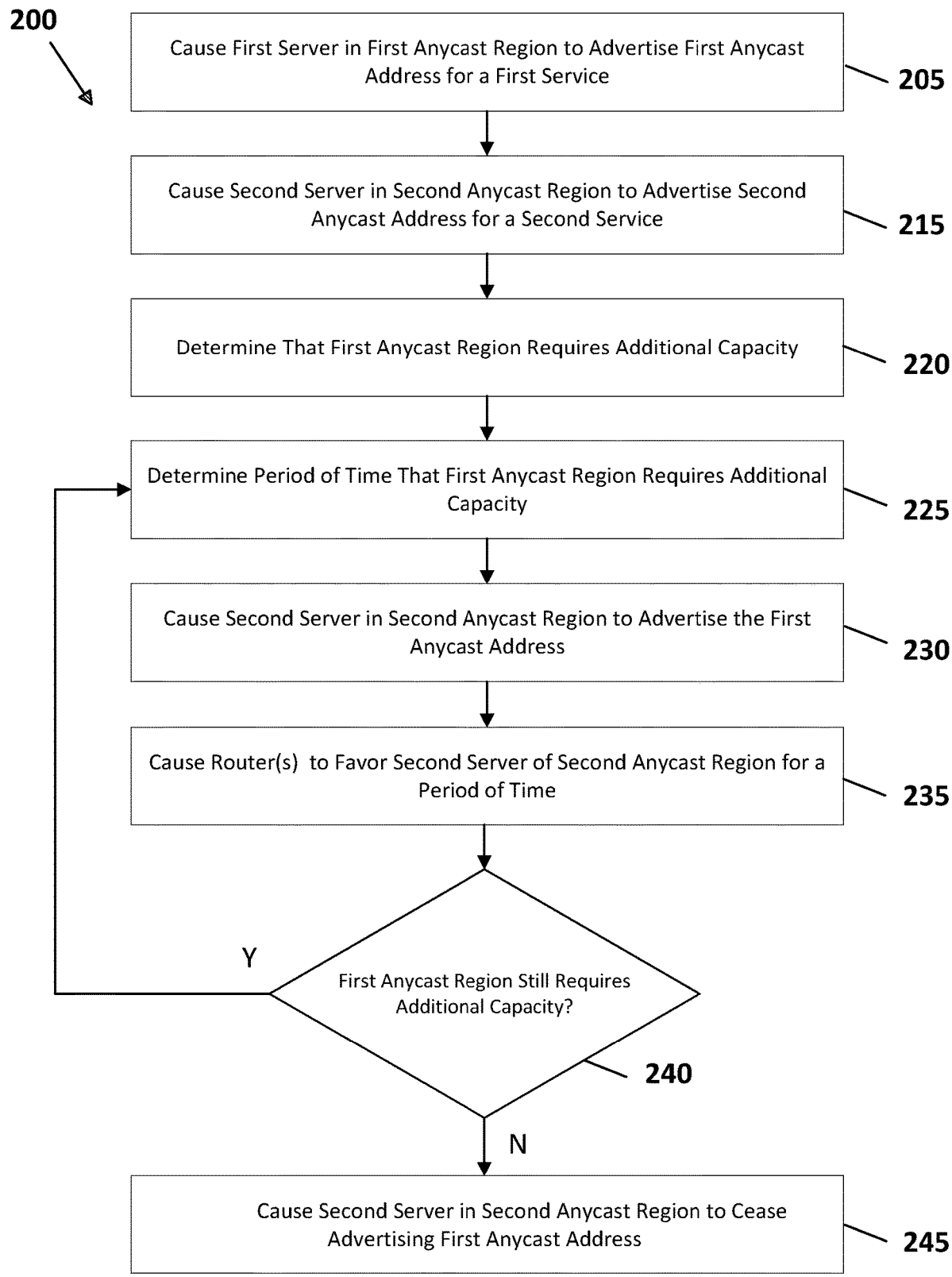
FIG. 2 depicts a flow chart describing an example method according to aspects of the present application.

FIG. 2 depicts a flow diagram describing operations of a nonexclusive example method 200. At operation 205, at least a first server set in a first Anycast region is caused to advertise a first Anycast address for a first service, wherein the first server set comprises at least a first server. For example, management system 105 may cause servers 121, 122, and 123 in a first Anycast region (e.g., Anycast region R1 111) to advertise a first Anycast address by making BGP announcements, or using any other suitable addressing or routing protocol. In examples, the advertisement of the first Anycast address by servers 121, 122, and 123 may cause router(s) 131 in the first Anycast region R1 to populate routing tables that include routes to servers 121, 122, and 123 for any messages received by the router(s) 131 addressed to the first Anycast address.

Flow proceeds to operation 215, where at least a second server set in a second Anycast region is caused to advertise a second Anycast address for a second service, wherein the second server set comprises at least a second server. For example, management system 105 may cause servers 124, 125, and 126 in a second Anycast region (e.g., Anycast region R2 112) to advertise a second Anycast address by making BGP announcements, or using any other suitable addressing or routing protocol. In examples, the advertisement of the second Anycast address by servers 124, 125, and 126 may cause router(s) 132 in the second Anycast region R2 to populate routing tables that include routes to servers 124, 125, and 126 for any messages received by the router(s) 132 addressed to the second Anycast address.

Flow proceeds to operation 220, where it is determined that a first Anycast region requires additional capacity, wherein the first Anycast region comprises at least the first server set. As discussed, in examples, management system 105 may determine that servers 121, 122, and 123 in a first Anycast region (e.g., Anycast region R1 111) may require additional capacity to process client requests directed to the first Anycast address.

Figure 3A:
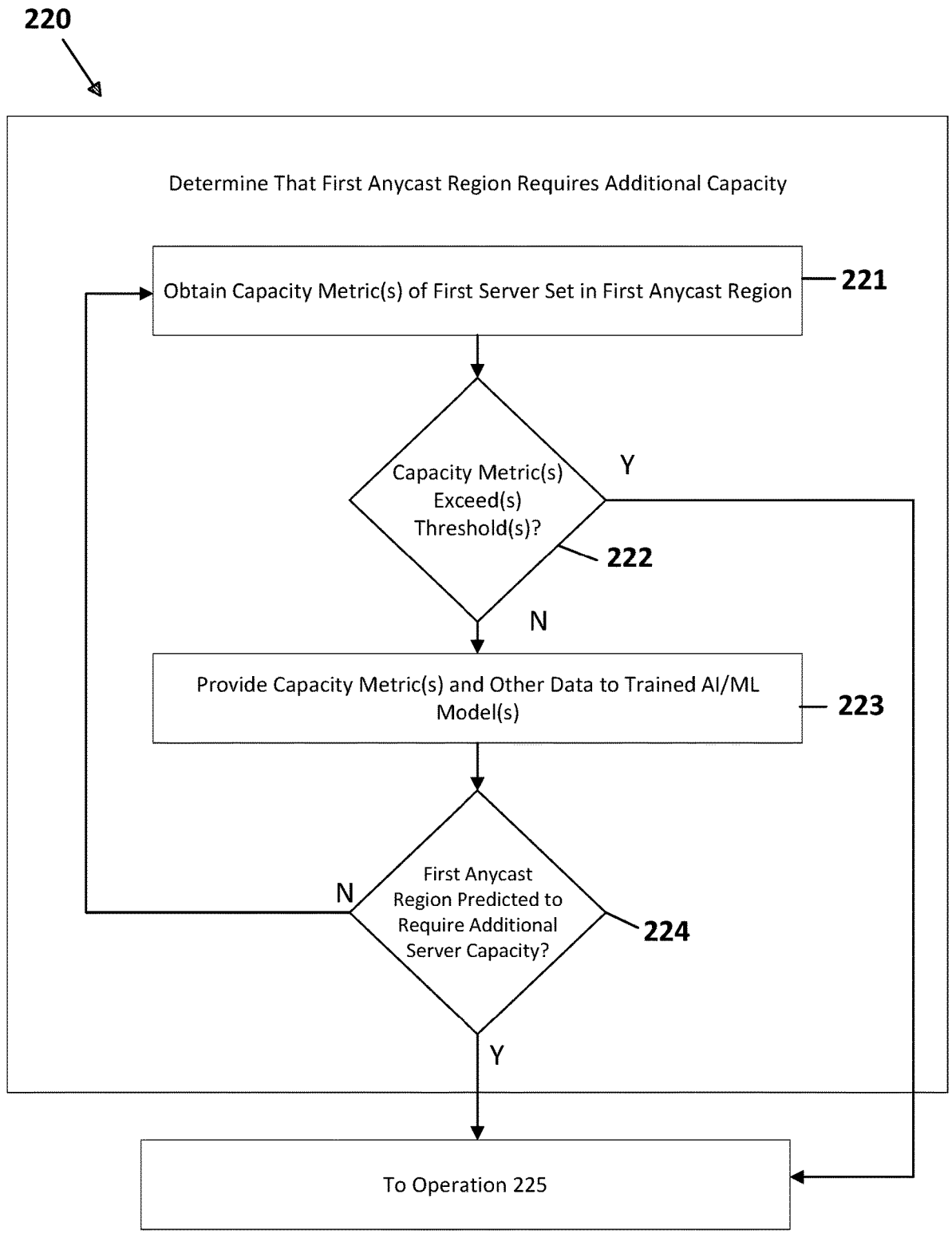
FIG. 3A depicts a flow chart describing an example of operation 220 in FIG. 2.

Referring to FIG. 3A, one nonexclusive example of operation 220 is depicted. In examples, at operation 221, capacity metric(s) of at least a first server set in a first anycast region may be obtained. For example, management system 105 may obtain one or more capacity metrics of a first server set in a first Anycast region R1. In examples, the first server set may comprise one or more of servers 121, 122, 123. In examples, the management system 105 may periodically query the servers 121, 122, 123, or one or more devices associated with such servers (such as NetFlow collectors, etc.) for capacity metrics. In other examples, the servers 121, 122, 123 may be configured (e.g., with a software agent) to periodically transmit capacity metrics to the management system 105 either directly or through one or more intermediate device(s).

In examples, flow proceeds to operation 222, where it is determined whether capacity metric(s) exceed(s) threshold(s) for the first server set. In examples, management system 105 may, after obtaining the capacity metrics of a first server set in a first Anycast region R1, determine whether the current capacity metric(s) exceed(s) threshold(s) for the first server set. As discussed, thresholds may be time-based. For example, a threshold may comprise a certain number of client requests that are processed within a preset window of time (e.g., the past X minutes, or CPU usage that has been over X % for Y minutes, etc.). In addition, the threshold(s) may be based on a combination of more than one metric (e.g., CPU usage over X % for Y minutes and number of lost packets exceeding a limit within a preset window, etc. Further, thresholds, in some examples, may be set based on a capacity metric for an individual server, for multiple servers, or for an entire Anycast region. For example, a threshold might comprise any one server being over X % CPU usage, while another threshold may comprise the cumulative CPU usage for the entire Anycast region exceeding X %. Other thresholds are possible and contemplated.

Further, as discussed, threshold(s) may be established by management system 105 in a variety of manners. For example, management system 105 may include a user interface to allow an administrator to set manual thresholds. In other examples, thresholds may be automatically set and/or continually adjusted via AI/ML systems as part of management system 105, or otherwise. In examples, threshold(s) may be the same for servers in Anycast regions R1 and R2 or they may vary by region. In further examples, the thresholds may also be automatically set and/or changed based on artificial intelligence and/or machine learning (AI/MI) operating as part of or in concert with management system 105.

If, at operation 222, it is determined that one or more relevant threshold(s) are exceeded by current capacity metric(s), then flow proceeds to operation 225, discussed further below. If not, flow proceeds to operation 223, where it is determined whether the first Anycast region is predicted to require additional server capacity. For example, even if the current capacity metric(s) do not exceed any relevant threshold(s), the capacity metric(s) may indicate that such threshold(s) are likely to be exceeded within some upcoming prediction period. That is, the management system 105 may comprise, or operate in concert with, one or more trained AI/ML models that can predict (e.g., based on capacity metric(s) and/or other available network information) that additional server capacity is likely to be needed within a prediction period, such as one minute, ten minutes, one hour, one day, etc. In examples, the prediction period may be a configurable parameter of the management system 105.

For example, an AI/ML model comprising part of management system 105 may be trained on earlier labeled data sets of capacity metrics of servers in one or more Anycast region. In examples, the earlier data sets may include capacity metrics such as CPU usage, memory usage, packet loss, error message rate, number of requests received, request latency, response latency, etc. Thresholds automatically set by the AI/ML model during training may be verified/tuned based on the training sets. Further, the training data (and the data used to determine at operation 224 whether the first Anycast region is predicted to need additional capacity within a prediction period) may include other data available in network 100 beyond just capacity metrics. For example, if the servers are caching servers 121, 122, 123 in a CDN, the other data may include information about release dates for particular content or other data indicative of a future increase in demand on a particular Anycast region. In other examples, the AI/ML model of management system 105 may be trained on historical data and then improved by unsupervised learning (e.g., a feed-forward neural network). In either event (supervised or unsupervised learning), over time, the AI/ML model employed by management system 105 may continually determine and/or adjust the thresholds in order to maximize performance of system 100 (e.g., to maximize usage of servers in different Anycast regions and to avoid service or network failures). If it is determined at operation 224 that the first Anycast region is predicted to require additional server capacity, then flow proceeds to operation 225. Otherwise, flow loops back to operation 221.

With reference back to FIG. 2, flow eventually proceeds to operation 225, where management system 105 determines a period of time that a first Anycast region may require additional capacity. For example, management system 105 may determine that a first Anycast region may require additional capacity for a period of time that one or more capacity metrics of the first server set exceed (or is/are expected to exceed) a threshold for the first server set. In examples, management system 105 may determine a period of time via an AI/ML model operating as part of or in concert with management system 105. For example, management system 105 may determine that servers 121, 122 and 123 in Anycast region R1 require additional capacity for a period of time starting when the capacity metric(s) either do, or are predicted to, exceed at least one threshold, and ending when the capacity metric(s) either do, or are predicted to, fall below the applicable threshold(s).

Figure 3B:
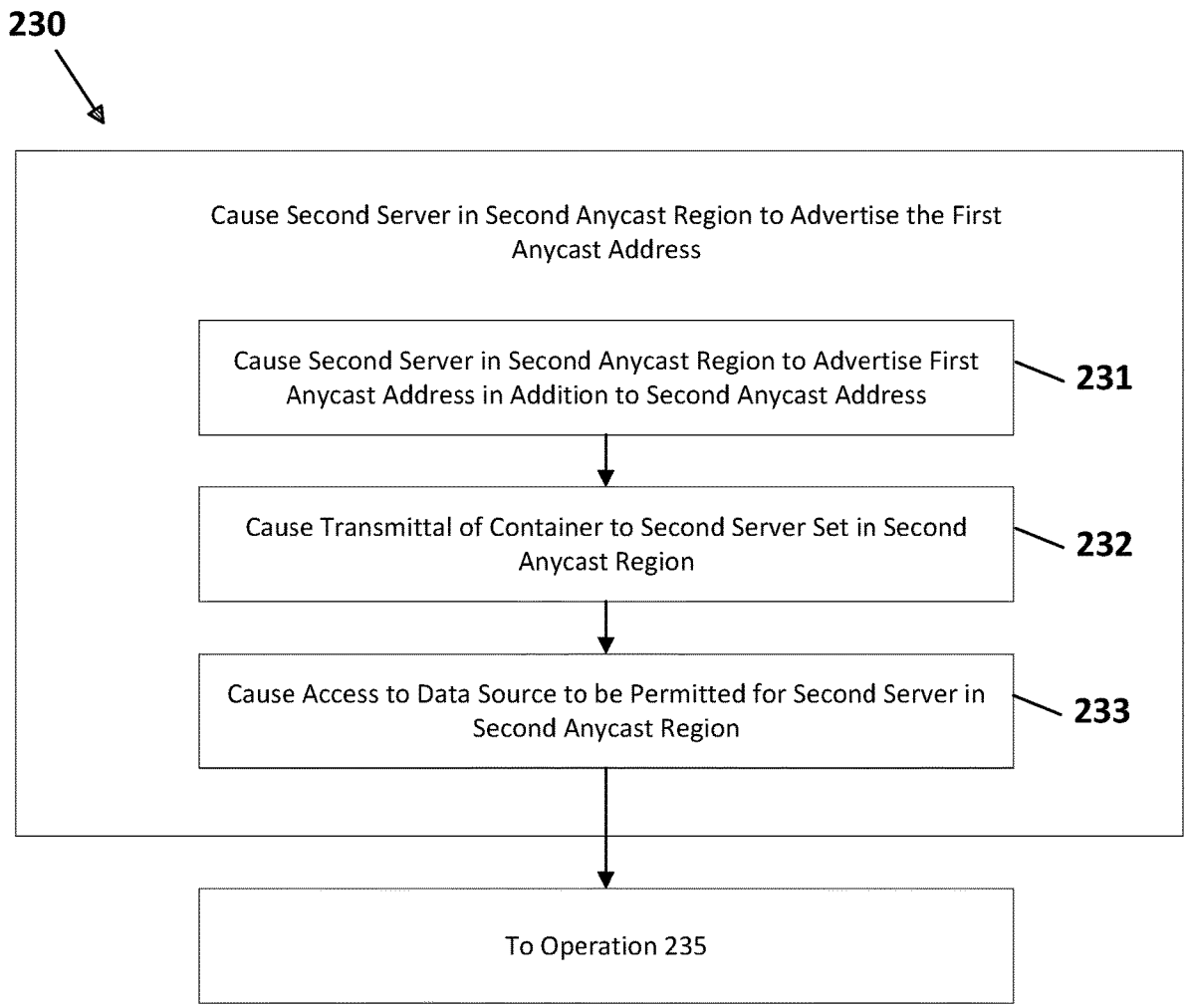
FIG. 3B depicts a flow chart describing an example of operation 230 in FIG. 2.

Flow proceeds to operation 230, where a second server in a second Anycast region is caused to advertise the first Anycast address. A non-exclusive example of operation 230 is depicted at FIG. 3B. For example, at operation 231, management system 105 may cause server 124 in second Anycast region R1 112 to advertise the first Anycast address for the period of time determined at operation 225. In some examples, the period of time determined at operation 225 includes a start time, but the end time is not determined unless and until the network conditions change enough to warrant the second server set to no longer providing additional capacity to the first Anycast region R1 111. In examples, management system 105 may cause the server 124 to advertise the first Anycast address while still advertising the second Anycast address. In other examples, management system 105 may cause all of the servers 124, 125, and 126 in Anycast region R2 to advertise the Anycast address of Anycast region R1. In examples, operation 230 may also comprises determining (and predicting) that the one or more servers of Anycast region R2 112 will, e.g., during the period determined at operation 225, have the excess capacity required to provide the additional capacity needed by Anycast region R1 111.

In some examples, at operation 232, a container may also be caused to be sent to the second server set in the second Anycast region. For example, management system 105 may also cause a container to be transmitted to the second server set (such as server 124 and/or all of servers 124, 125, 126). As discussed, in examples, the container may comprise of a pointer to a database or other data source that may be used to process client requests directed to the first Anycast address.

In further examples, at operation 233, access to a data source may be caused to be permitted for the second server set in the second Anycast region. For example, management system 105 may permit the second server set to access a database or other data source of, or accessible to, the servers 121, 122, 123 in Anycast region R1 111. In examples, management system 105 may provide server 124 (and/or servers 125, 126) with authorization token(s), or other permissions, to communicate with data sources employed by Anycast region R1 111.

Referring back to FIG. 2, flow proceeds to operation 235, where routers(s) may be caused to favor the second server set in routing to the first Anycast address, e.g., for the period of time determined at operation 225. In examples, this may be accomplished by causing the router(s), e.g., router(s) 131, to populate their routing tables with a route for the first Anycast address to server 124 in the second Anycast region. As discussed, in addition to populating the routing table(s) of router(s) 131, management system 105 may intentionally promote a routing path to server(s) of Anycast region R2 112 that are temporarily advertising the first Anycast address, even if the routing table(s) continue to include routing destinations to servers 121, 122, 123 of the first Anycast region R1 111. In this way, router(s) 131 of a first Anycast region may be caused by management system 105 to temporarily route client requests to a server (e.g., server 124) of a second Anycast region R1 112, even if server 124 is not the logically closest server.

Flow proceeds to operation 240, where it is determined whether the first Anycast region still requires additional capacity. In examples, operation 240 may be triggered at the end of the period of time determined at operation 225. In other examples, operation 240 may be periodically performed based on updated capacity metrics even during the period of time determined at operation 225. As such, a time to cease the advertisement by the second server set of the first Anycast address may be dynamically determined based on network conditions. In examples, operation 224 may comprise one or more of the operations 221, 222, 223, 224 based on updated capacity information and other network-available information.

If, at operation 240, it is determined that the first Anycast region still requires additional capacity, flow branches "yes" from operation 240 back to operation 225, and management system 105 may cause the second server set to continue advertising the first Anycast address. When it is determined at operation 240 that the first Anycast region does not still require additional capacity, and flow branches "no" to operation 245.

At operation 245, the second server set in the second Anycast region is caused to cease advertising the first Anycast address. In examples, management system 105 may cause the second server set to cease advertising the first Anycast address even if the first server set in a first Anycast region still requires additional capacity. For example, management system 105 may determine that the second Anycast regions R2 112, itself, now requires more capacity. As such, management system 105 may cause all of the second server set to stop advertising the first Anycast address. In further examples, management system 105 may cause specific server(s) of the second server set in Anycast region R2 112 to stop advertising the first Anycast address. For example, management system 105 may cause server 124 from a second server set that includes servers 124, 125, and 126, to stop advertising the first Anycast address of Anycast region R1 while causing servers 125, and 126 to continue to advertise the first Anycast address. In addition, the management system 105 may cause additional capacity to be added by a different Anycast region that now has excess capacity (e.g., a third Anycast region (not shown). Further, in examples where demand will rotate between and among Anycast regions, the management system 105 may start causing one or more of the first set of servers (e.g., 121, 122, 123) to begin advertising the second Anycast address to provide additional capacity, as needed, to Anycast region R2 112.

Figure 4:
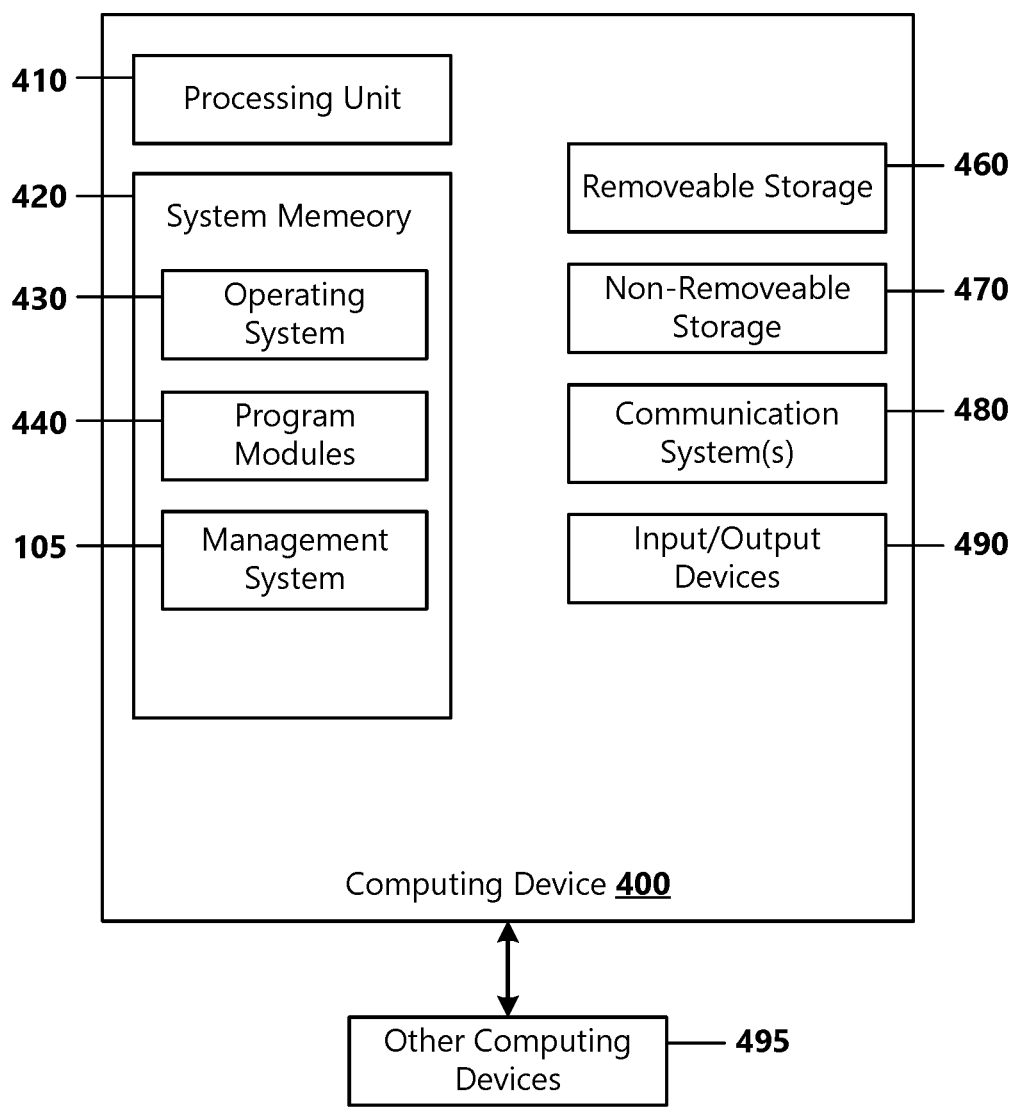
FIG. 4 depicts an example computing environment with which aspects of the present application may be practiced.

FIG. 4 is a block diagram illustrating physical components of an example computing device with which aspects may be practiced. The computing device 400 may include at least one processing unit 402 and a system memory 404. The system memory 404 may comprise, but is not limited to, volatile (e.g. random access memory (RAM)), non-volatile (e.g. read-only memory (ROM)), flash memory, or any combination thereof. System memory 404 may include operating system 406, one or more program instructions 408, and may include sufficient computer-executable instructions for the management system 105, which when executed, perform functionalities as described herein. Operating system 406, for example, may be suitable for controlling the operation of computing device 400. Furthermore, aspects may be practiced in conjunction with a graphics library, other operating systems, or any other application program and is not limited to any particular application or system. This basic configuration is illustrated by those components within a dashed line 410. Computing device 400 may also include one or more input device(s) 412 (keyboard, mouse, pen, touch input device, etc.) and one or more output device(s) 414 (e.g., display, speakers, a printer, etc.).

The computing device 400 may also include additional data storage devices (removable or non-removable) such as, for example, magnetic disks, optical disks, or tape. Such additional storage is illustrated by a removable storage 416 and a non-removable storage 418. Computing device 400 may also contain a communication connection 420 that may allow computing device 400 to communicate with other computing devices 422, such as over a network in a distributed computing environment, for example, an intranet or the Internet. Communication connection 420 is one example of a communication medium, via which computer-readable transmission media (i.e., signals) may be propagated.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, flash drives, or a CD-ROM, or other forms of RAM or ROM. The term computer-readable storage medium refers only to devices and articles of manufacture that store data or computer-executable instructions readable by a computing device. In examples, computer-readable storage media is tangible and non-transitory. The term computer-readable storage media does not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 400 or any other computing devices 422, in combination with computing device 400, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure of the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

What is claimed is:

1. A method, comprising:
    causing at least a first server set in a first Anycast region to advertise a first Anycast address for a first service, wherein the first server set comprises at least a first server;
    causing at least a second server set in a second Anycast region to advertise a second Anycast address for a second service, wherein the second server set comprises at least a second server;
    determining that a first Anycast region requires additional server capacity;
    determining a period of time to provide the additional server capacity;
    in response to determining that the first Anycast region requires additional server capacity, causing the second server in the second Anycast region to advertise the first Anycast address;
    after the period of time, causing the second server in the second Anycast region to cease advertising the first Anycast address;
    causing a container to be sent to the second server, wherein the container comprises a server for the first service and a pointer to a database hosted on a device in the first Anycast region; and
    causing the device in the first Anycast region to permit access to the database by the second server in the second Anycast region, wherein the database contains data for the first service that is specific to the first Anycast region.

2. The method of claim 1, wherein determining that the first Anycast region requires additional server capacity comprises determining that a capacity metric has exceeded a threshold.

3. The method of claim 2, wherein the capacity metric comprises at least one of: processor usage, latency, and memory usage.

4. The method of claim 1, wherein determining that the first Anycast region requires additional server capacity comprises determining that a capacity metric is predicted to exceed a threshold within a prediction period.

5. The method of claim 1, wherein the period of time is dynamically determined.

6. The method of claim 5, wherein the period of time is dynamically determined based on a prediction of when the first Anycast region will no longer requires additional server capacity.

7. The method of claim 1, wherein causing the second server in the second Anycast region to advertise the first Anycast address comprises causing the second server in the second Anycast region to advertise the first Anycast address in addition to the second Anycast address.

8. The method of claim 1, further comprising causing routers in the first Anycast region to favor the second server during the period of time while the second server advertises the first Anycast address.

9. A system, comprising:

at least one processor; and memory, operatively connected to the at least one processor and storing instructions that, when executed by the at least one processor, cause the system to perform a method, the method comprising:

- causing at least a first server set in a first Anycast region to advertise a first Anycast address for a first service, wherein the first server set comprises at least a first server;
- causing at least a second server set in a second Anycast region to advertise a second Anycast address for a second service, wherein the second server set comprises at least a second server;
- determining that a first Anycast region requires additional server capacity;
- determining a period of time to provide the additional server capacity;
- in response to determining that the first Anycast region requires additional server capacity, causing the second server in the second Anycast region to advertise the first Anycast address;
- after the period of time, causing the second server in the second Anycast region to cease advertising the first Anycast address;
- causing a container to be sent to the second server, wherein the container comprises a server for the first service and a pointer to a database hosted on a device in the first Anycast region; and
- causing the device in the first Anycast region to permit access to the database by the second server in the second Anycast region, wherein the database contains data for the first service that is specific to the first Anycast region.

10. The system of claim 9, wherein determining that the first Anycast region requires additional server capacity comprises determining that a capacity metric has exceeded a threshold.

11. The system of claim 10, wherein the capacity metric comprises at least one of: processor usage, latency, and memory usage.

12. The system of claim 9, wherein determining that the first Anycast region requires additional server capacity comprises determining that a capacity metric is predicted to exceed a threshold within a prediction period.

13. The system of claim 9, wherein the period of time is dynamically determined.

14. The system of claim 13, wherein the period of time is dynamically determined based on a prediction of when the first Anycast region will no longer requires additional server capacity.

15. The system of claim 9, wherein causing the second server in the second Anycast region to advertise the first Anycast address comprises causing the second server in the second Anycast region to advertise the first Anycast address in addition to the second Anycast address.

16. The system of claim 9, wherein the method further comprises causing routers in the first Anycast region to favor the second server during the period of time while the second server advertises the first Anycast address.

17. A system, comprising:

at least one processor; and memory, operatively connected to the at least one processor and storing instructions that, when executed by the at least one processor, cause the system to perform a method, the method comprising:

- causing at least a first server set in a first Anycast region to advertise a first Anycast address for a first service, wherein the first server set comprises at least a first server;
- causing at least a second server set in a second Anycast region to advertise a second Anycast address for a second service, wherein the second server set comprises at least a second server;
- determining that a first Anycast region requires additional server capacity;
- in response to determining that the first Anycast region requires additional server capacity, causing the second server in the second Anycast region to advertise the first Anycast address;
- dynamically determining whether the first Anycast region continues to require additional server capacity;
- based on dynamically determining that the first Anycast region no longer requires additional server capacity, causing the second server in the second Anycast region to cease advertising the first Anycast address;
- causing a container to be sent to the second server, wherein the container comprises a server for the first service and a pointer to a database hosted on a device in the first Anycast region; and
- causing the device in the first Anycast region to permit access to the database by the second server in the second Anycast region, wherein the database contains data for the first service that is specific to the first Anycast region.

* * * * *